United States Patent
Saitoh

(10) Patent No.: US 7,694,017 B2
(45) Date of Patent: Apr. 6, 2010

(54) COMMUNICATION APPARATUS, IP ADDRESS ACQUISITION METHOD AND ROAMING METHOD

(75) Inventor: Atsushi Saitoh, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 940 days.

(21) Appl. No.: 10/293,639

(22) Filed: Nov. 13, 2002

(65) Prior Publication Data

US 2003/0097473 A1    May 22, 2003

(30) Foreign Application Priority Data

Nov. 16, 2001    (JP) .............................. 2001-351469

(51) Int. Cl.
G06F 15/16    (2006.01)

(52) U.S. Cl. .................................................... 709/245

(58) Field of Classification Search .................. 709/245
See application file for complete search history.

(56) References Cited

U.S. PATENT DOCUMENTS

| | | | | |
|---|---|---|---|---|
| 6,064,649 A * | 5/2000 | Johnston | ............... | 370/310.2 |
| 6,195,705 B1 * | 2/2001 | Leung | ............... | 709/245 |
| 6,233,452 B1 * | 5/2001 | Nishino | ............... | 455/435.2 |
| 6,246,670 B1 * | 6/2001 | Karlsson et al. | ............. | 370/244 |
| 6,577,609 B2 * | 6/2003 | Sharony | ............... | 370/312 |
| 6,601,093 B1 * | 7/2003 | Peters | ............... | 709/220 |
| 6,687,755 B1 * | 2/2004 | Ford et al. | ............... | 709/245 |
| 6,894,994 B1 * | 5/2005 | Grob et al. | ............... | 370/335 |
| 2001/0023446 A1 * | 9/2001 | Balogh | ............... | 709/229 |
| 2001/0024953 A1 * | 9/2001 | Balogh | ............... | 455/432 |
| 2002/0045423 A1 * | 4/2002 | Sashihara et al. | ............... | 455/11.1 |

OTHER PUBLICATIONS

"Linksys Wireless USB Network Adapter", Linksys, 2001.*
"Linksys Wireless Network Access Point", Linksys, 2001.*
Archive.org, "Instant Wireless", Jun. 2001.*
Wavit11 User manual, Dec. 2001, Mitsumi.*

* cited by examiner

*Primary Examiner*—Thu Nguyen
*Assistant Examiner*—Julian Chang
(74) *Attorney, Agent, or Firm*—Ladas & Parry LLP

(57) ABSTRACT

In a wireless network in which an addressing server allocates an IP address, there are provided an IP address acquisition method, a communication apparatus and a roaming method whereby a terminal can automatically acquire an IP address from the addressing server. An IP address acquisition method for acquiring an IP address for a terminal 14 from a addressing server 18 comprises the steps of: providing the terminal 14 with a temporary IP address in a case that a first communication apparatus 10 is not capable of connecting with a second communication apparatus 12 when the first communication apparatus 10 receives an IP address request message from the terminal 14; discarding the temporary IP address from the terminal 14 when it becomes possible to connect with the second communication apparatus 12 and a communication path is established; and acquiring an IP address for the terminal 14 from the addressing server 18 via the communication path.

1 Claim, 8 Drawing Sheets

COMMUNICATION APPARATUS, IP ADDRESS ACQUISITION METHOD AND ROAMING METHOD

BACKGROUND OF THE INVENTION

1. Field of the Invention

The present invention relates to communication apparatuses connecting between a terminal and a network by wireless, and more particularly to a communication apparatus, an IP address acquisition method and a roaming method in which the terminal can acquire an IP address from an addressing server.

2. Description of the Related Art

In order to communicate by using IP (Internet Protocol) in a network such as a LAN (Local Area Network), it is necessary to acquire and set an IP address for a terminal. There are two methods to set the IP address for the terminal; One is a method in which the IP address is manually set. The other is a method in which the IP address is set by using DHCP (Dynamic Host Configuration Protocol). When the IP address is manually set, a network administrator needs to manage IP addresses for terminals therein so that an identical IP address cannot be simultaneously allocated to a plurality of terminals. In contrast, under the DHCP, an IP address is dynamically and automatically allocated to a terminal. In the DHCP, when a terminal gains access to a DHCP server, an IP address is allocated for the terminal. The DHCP is currently used in a large number of networks.

On the other hand, a wireless LAN has been widespread recently. As shown in FIG. 1, in a wireless LAN, information is communicated by wireless between a station 10 connected with a PC 14 and an access point 12 connected with the LAN. In FIG. 1, the station is connected with the PC 14 by a fixed line, and the access point 12 is connected with a network by a fixed line. Also, a DHCP server 18 is connected with the network.

In such a wireless LAN, IP addresses have to be allocated to not only the PC 14 but also the station 10 and the access point 12 that are serving to implement wireless communication.

A description will be given of a procedure to set an IP address for the PC 14 by using the DHCP server 18 under this configuration. At the beginning, there are prepared the same number of IP addresses as the number of access points. In this configuration, just one IP address should be prepared because there is only one access point 12. Next, a temporary IP address is manually set to the PC 14. As the temporary IP address, there is provided an IP address whose network address (to be mentioned later) is identical to that of the prepared address. After receiving the temporary IP address, the PC 14 is engaged to set the prepared IP address to the station 10 and the access point 12. Since this configuration has just the access point 12 therein, the station 10 and the access point 12 may have an identical IP address. Thus, the identical IP address is allocated to the station 10 and the access point 12.

The station 10 and the access point 12 to which the identical IP address is allocated are connected with the PC 14 and a network 16, respectively. In this manner, the PC 14 gains a connection with the network 16 via the station 10 and the access point 12. After that, an IP address setting of the PC 14 is modified into a setting such that the PC 14 acquires an IP address through DHCP, and then the PC 14 is rebooted to apply the modification. In the above-mentioned procedure, the PC 14 can acquire an IP address from the DHCP server 18 via the station 10 and the access point 12.

As mentioned above, even when the DHCP is used to set an IP address automatically in a wireless LAN, it is necessary to perform complicated tasks for setting some apparatuses to implement a wireless LAN and further reboot a PC to apply a new setting.

SUMMARY OF THE INVENTION

It is a general object of the present invention to provide a communication apparatus, an IP address acquisition method and a roaming method in which the above-mentioned problems are eliminated.

A more specific object of the present invention is to provide a communication apparatus, an IP address acquisition method and a roaming method in which a terminal can automatically acquire an IP address from an addressing server in a wireless network necessary for the IP address.

In order to achieve the above-mentioned objects, there is provided according to one aspect of the present invention an IP address acquisition method for acquiring an IP address for a terminal from a dynamic addressing server in a communication system having a first communication apparatus connected with the terminal and a second communication apparatus connected with the dynamic addressing server wherein the first communication apparatus communicates via the second communication apparatus connected by wireless with the first communication apparatus, the method comprising the steps of: providing a temporary IP address to the terminal in a case where it is impossible to connect the first communication apparatus to the second communication apparatus when the first communication apparatus receives an IP address request message from the terminal; discarding the temporary IP address from the terminal when it is possible to connect the first communication apparatus with the second communication apparatus and establish a communication path; and acquiring an IP address for the terminal from the dynamic addressing server via the communication path.

In the above-mentioned IP address acquisition method, the first communication apparatus may serve for the step of providing a temporary IP address to the terminal and the step of discarding the temporary IP address from the terminal, and the terminal may serve for the step of acquiring an IP address for the terminal.

According to the above-mentioned invention, in a state that there is no connection between the first communication apparatus and the second communication apparatus and the first communication apparatus cannot connect to the second communication apparatus, when receiving an IP address request message from the terminal, the first communication apparatus provides the terminal with a temporary IP address. After establishing a connection with the second communication apparatus, the first communication apparatus makes the terminal discard the temporary IP address and the terminal can acquire an IP address from the dynamic addressing server via the established communication path.

Additionally, there is provided according to another aspect of the present invention an IP address acquisition method for acquiring an IP address for a terminal from a dynamic addressing server in a communication system having a first communication apparatus connected with the terminal and a second communication apparatus connected with the dynamic addressing server wherein the first communication apparatus communicates via the second communication apparatus connected by wireless with the first communication apparatus, the method comprising the steps of: establishing a communication path between the first communication apparatus and the second communication apparatus in a case where it is possible to connect the first communication apparatus to the second communication apparatus when the first communication apparatus receives an IP address request message from the terminal; transferring the IP address request message to the dynamic addressing server; and acquiring an IP address for the terminal from the dynamic addressing server via the communication path.

In the above-mentioned IP address acquisition method, the first communication apparatus may serve for the step of establishing a communication path between the first communication apparatus and the second communication apparatus and the step of transferring the IP address request message to the dynamic addressing server, and the terminal may serve for the step of acquiring an IP address for the terminal.

According to the above-mentioned invention, in a state that there is no connection between the first communication apparatus and the second communication apparatus, when receiving an IP address request message from the terminal, the first communication apparatus attempts to connect to the second communication apparatus. After establishing a communication path, the first communication apparatus sends the IP address request message to the dynamic addressing server via the established communication path. As a result, the terminal can acquire an IP address from the dynamic addressing server.

Additionally, there is provided according to another aspect of the present invention a roaming method for conducting a roaming in a communication system having a first communication apparatus connected with a terminal and a plurality of second communication apparatuses connected with a dynamic addressing server wherein the first communication apparatus has communicated via one of the second communication apparatuses that maintains a connection by wireless with the first communication apparatus and conducts a roaming from the one of the second communication apparatuses to another one of the second communication apparatuses, the method comprising the steps of: requesting a reconnection with the another one of the second communication apparatuses and establishing a communication path when the first communication apparatus detects a disconnection between the first communication apparatus and the one of the second communication apparatuses; discarding an IP address from the terminal when a network address of the one of the second communication apparatuses is different from a network address of the another one of the second communication apparatuses; and acquiring an IP address from the dynamic addressing server via the communication path established by a reconnection request of the first communication apparatus and conducting a roaming from the one of the second communication apparatuses to the another one of the second communication apparatuses.

In the above-mentioned roaming method, the first communication apparatus may serve for the step of requesting a reconnection with the another one of the second communication apparatuses and establishing a communication path and the step of discarding an IP address from the terminal, and the terminal may serve for the step of acquiring an IP address from the dynamic addressing server.

According to the above-mentioned invention, even if the first communication apparatus has already acquired an IP address from the dynamic addressing server, when the first communication apparatus detects a disconnection with one of the second communication apparatuses, the first communication apparatus can request a reconnection with another one of the second communication apparatuses, establish a communication path and accomplish a roaming from the one of the second communication apparatuses to the another one of the second communication apparatuses. Also, even if the terminal has already acquired an IP address from the dynamic addressing server, the terminal can acquire an IP address corresponding to a network address to which the another one of the second communication apparatuses belongs by discarding the old IP address if necessary. As a result, the roaming is successfully accomplished.

Additionally, there is provided according to another aspect of the present invention a communication apparatus for relaying by wireless between a terminal and a dynamic addressing server, comprising: a temporary IP address providing part providing the terminal with a temporary IP address when an IP address request message is received from the terminal; and a temporary IP address throwing part discarding the temporary IP address from the terminal.

According to the above-mentioned invention, when it is impossible to establish a communication path with the dynamic addressing server, the temporary IP address part makes it possible to communicate between the communication apparatus and the terminal. Once the communication path between the dynamic addressing server and the terminal is established, the temporary IP throwing part makes the terminal discard an IP address and send an IP address request message again. As a result, the terminal can acquire an IP address from the dynamic addressing server.

Additionally, there is provided according to another aspect of the present invention a communication apparatus for relaying by wireless between a terminal and a dynamic addressing server, comprising: a maintaining part maintaining an IP address request message when the IP address request message is received from the terminal; and a transferring part transferring the IP address request message maintained.

According to the above-mentioned invention, when an IP address request message is received from the terminal, if it is possible to establish a connection path between the terminal and the dynamic addressing server, the IP address request message is maintained. After the communication path is established, the maintained IP address request message is transferred to the dynamic addressing server and an IP address is allocated to the terminal.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
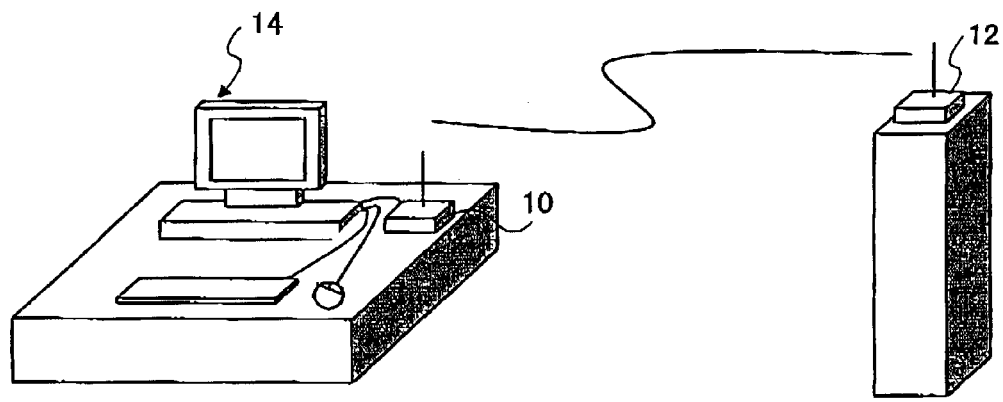
FIG. 1 is a diagram illustrating a configuration of a wireless LAN.
Figure 2:
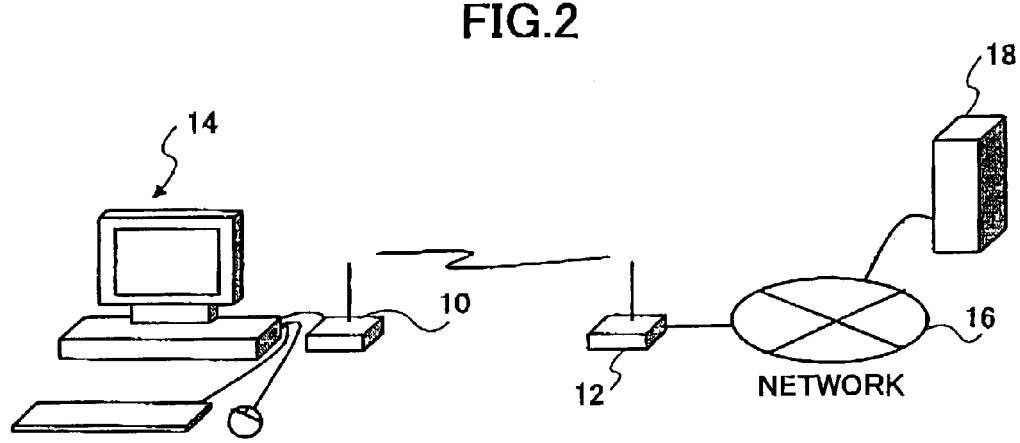
FIG. 2 is a diagram illustrating a configuration of a wireless LAN according to an embodiment of the present invention.

FIG. 2 shows an entire configuration according to the embodiment of the present invention. In FIG. 2, there are illustrated communication apparatuses 10 and 12, a PC 14 connected with the communication apparatus 10, a network 16 connected with the communication apparatus 12, and a DHCP server 18 connected with the network 16. The communication apparatus 10 is connected with the PC 14 in a cable such as a 10Base-T, and the communication apparatus 12 is also connected with the network 16 in a cable such as a 10Base-T.

Figure 3:
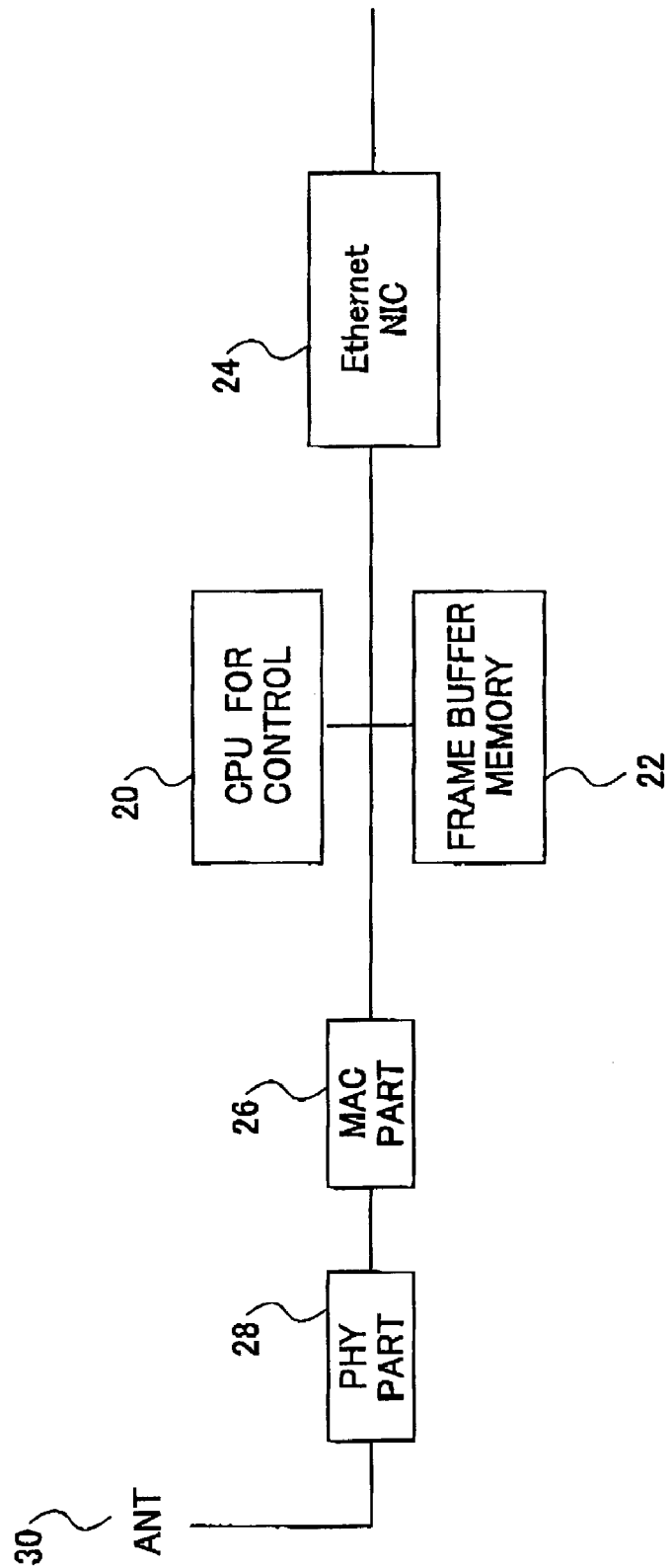
FIG. 3 is a block diagram illustrating hardware of a communication apparatus.

A description will now be given of the communication apparatuses 10 and 12. The communication apparatuses 10 and 12 are formed of a similar type of communication apparatus, and can switch into a plurality of modes to be mentioned later. FIG. 3 shows a block diagram illustrating hardware of the communication apparatuses 10 and 12. The communication apparatuses 10 and 12 shown in FIG. 3 comprise a CPU for control 20, a frame buffer memory 22, an Ethernet MAC Controller 24 for connecting to a network, a MAC part 26 in a MAC layer serving for a media access control in a MAC sub-layer, a PHY part 28 for serving as an interface with a physical layer, and an antenna 30. In this configuration, data from the Ethernet MAC Controller 24 is temporally stored in the frame buffer memory 22. Then, the MAC part 26 performs a media access control in accordance with the CSMA/CA method (IEEE802.11) for the data, and the data is formed as a frame in accordance with the IEEE802.11 and is delivered in the PHY part 28, which is eventually propagated through the antenna 30. On the other hand, data from the antenna 30 is lifted in the PHY part 28 from the physical layer to the MAC sub-layer, and the MAC part 26 performs a media access control for the data. Then, the data is temporally stored in the frame buffer memory 22 and is sent through the Ethernet MAC Controller 24. The CPU for control 20 is responsible to control such a data receiving and sending process.

A description will now be given of the above-mentioned operational mode. As the operational mode, there are prepared at least two modes: a station mode (Hereinafter, notated as an STA mode) and an access point mode (Hereinafter, notated as an AP mode). The STA mode is a mode as the communication apparatus 10 for performing a connecting process with the PC 14. The AP mode is a mode as the communication apparatus 12 for performing a connecting process with the network 16 and serving as an access point between the communication apparatus 10 and the network 16.

A description will now be given of some settings regarding the communication apparatuses 10 and 12. Among primary setting items regarding the communication apparatuses 10 and 12, there are a mode setting regarding the above operational modes, an SSID setting, a cipher setting, an authentication setting, and a roaming setting. The SSID is a kind of a name of an apparatus and is an ID represented as a sequence formed of 32 characters of an ASCII code. The cipher setting, which is involved in ciphering data exchanged between the STA mode and the AP mode, sets a ciphering mode (a bit length, a type of cipher, and a length of key). The authentication setting, which is involved in authentication between an apparatus in the STA mode and an apparatus in the AP mode, sets an authentication algorithm. These settings can be set by connecting with a computer such as a PC.

The description will now be given of a way in which the PC 14 acquires an IP address from the DHCP server 18 by using the communication apparatuses 10 and 12 provided under the above-mentioned configuration. The description will be given separately from two cases: One case is that it is impossible to connect with the communication apparatus 12 when the communication apparatus 10 receives an IP address request from the PC 14. The other is that it is possible to connect with the communication apparatus 12 when the communication apparatus 10 receives an IP address request from the PC 14. It should be noted that the communication apparatuses 10 and 12 are represented as an STA 10 and an AP 12 in the following description, respectively.

A description will now be given, with reference to FIG. 4, of the case that it is impossible to connect with the communication apparatus 12 when the communication apparatus 10 receives an IP address request from the PC 14. At the beginning, at step (1), the AP 12 sends a message "DHCP DISCOVER" (search) to search a DHCP server 18. At step (2), the DHCP server 18 sends a message "DHCP OFFER" (reply for search) back to the AP 12 to show that the DHCP server 18 works. At step (3), the AP 12 sends a message "DHCP REQUEST" (IP address request) to the DHCP server 18. At step (4), the DHCP server sends a message "DHCP ACK" (reply for IP address request) back to the AP 12, and an IP address (for example, 172.16.40.10) is allocated to the AP 12 by the DHCP server 18. On the other hand, when the DHCP server 18 cancels out an IP address that has been allocated to a DHCP client, the DHCP server 18 sends a message "DHCP RELEASE" to invalidate the IP address allocated. In the above manner, since the AP 12 has a connection with the network 16, the above-mentioned some settings regarding the AP 12 can be manipulated from another PC via the network 16.

A description will now be given of a correspondence between the PC 14 and the STA 10 being in the STA mode. Suppose that the PC 14 has such a setting that the PC 14 acquires an IP address by using DHCP. Further suppose that an IP address (for example, 192.168.1.1) is allocated to the SAT 10 as a default and that the SAT 10 uses the IP address until the SAT 10 knows an IP address of the AP 12 by establishing a connection with the AP 12. Currently, the STA 10 and the AP 12 are assumed to have no connection each other.

In the above situation, at step (5), the PC 14 sends a message "DHCP DISCOVER" to the STA 10. At step (6), the STA 10 sends a message "DHCP OFFER" back to the PC 14. At step (7), the PC 14 sends a message "DHCP REQUEST" (IP address request) to the STA 10. At step (8), the STA 10 sends a message "DHCP ACK" (reply for IV address request) back to the PC 14 and a temporary IP address (for example, 192.168.1.2) is allocated to the PC 14 by the STA 10. In the above manner, since the STA 10 has a connection with the PC 14, the above-mentioned some settings regarding the STA 10 can be manipulated from the PC 14. Now, since the STA 10 and the PC 14 are connected each other, if the STA 10 and the AP 12 are connected, the PC 14 and the network 16 are connected.

Regarding a connection between the STA 10 and the AP 12, at step (9), the STA 10 sends a message "Probe Request" to the AP 12. At step (10), the AP 12 sends a message "Probe Response" back to the STA 10. The exchange of these messages serves to check whether or not it is possible to communicate between the STA 10 and the AP 12. At steps (11) and (12), the STA 10 and the AP 12 send messages "Authentication" each other to authenticate between the STA 10 and the AP 12. After completing the authentication, the STA 10 sends a message "Association Request" to the AP 12 so as to connect thereto. At step (14), the AP 12 sends a message "Association Response" together with an IP address (172.16.40.10) back to the STA 10. This IP address is the address that has been already allocated to the AP 12 by the DHCP server 18. The STA 10 uses this IP address as its own address instead of the default IP address of the STA 10. After completing the connection between the STA 10 and the AP 12 in the above manner, the STA 10 sends a message "DHCP RELEASE" to the PC 14 so as to invalidate the temporary IP address that has been allocated to the PC 14. At step (16), the PC 14 sends the message "DHCP DISCOVER" again so as to acquire an IP address. This message "DHCP DISCOVER" is sent to the DHCP server 18 via the network 16 because the STA 10 and the AP 12 have the connection currently. According to the above-mentioned procedure that the AP 12 acquires the IP address from the DHCP server 18; at step (17), the DHCP server 18 sends the message "DHCP OFFER" back to the PC 14. At step (18), the PC 14 sends the message "DHCP REQUEST" (IP address request) to the DHCP server 18. At step (19), the DHCP server 18 sends the message "DHCP ACK" (reply for IP address request) back to the PC 14, whereby the PC 14 acquires an IP address.

Figure 5:
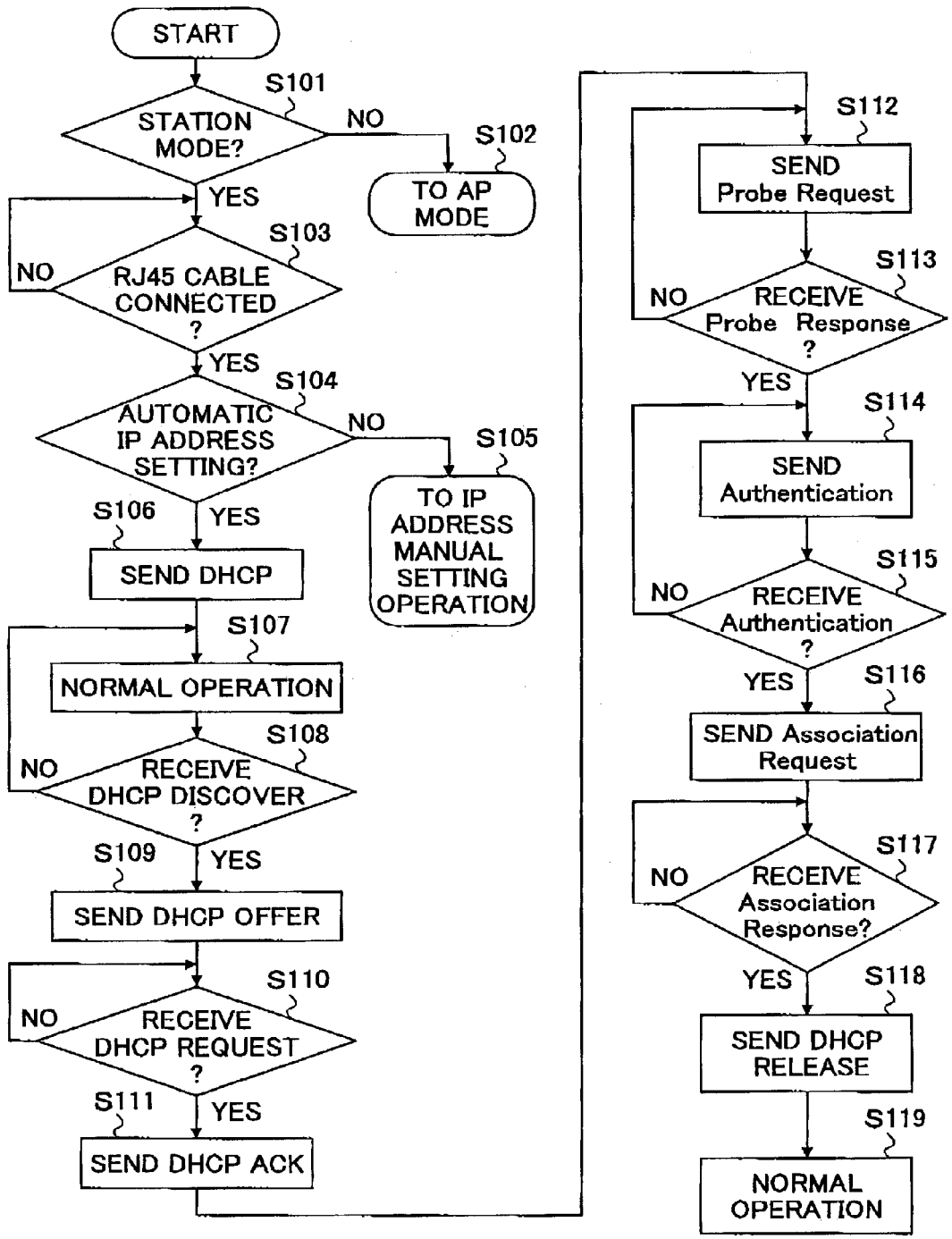
FIG. 5 is a flowchart illustrating a process in an STA mode.
Figure 6:
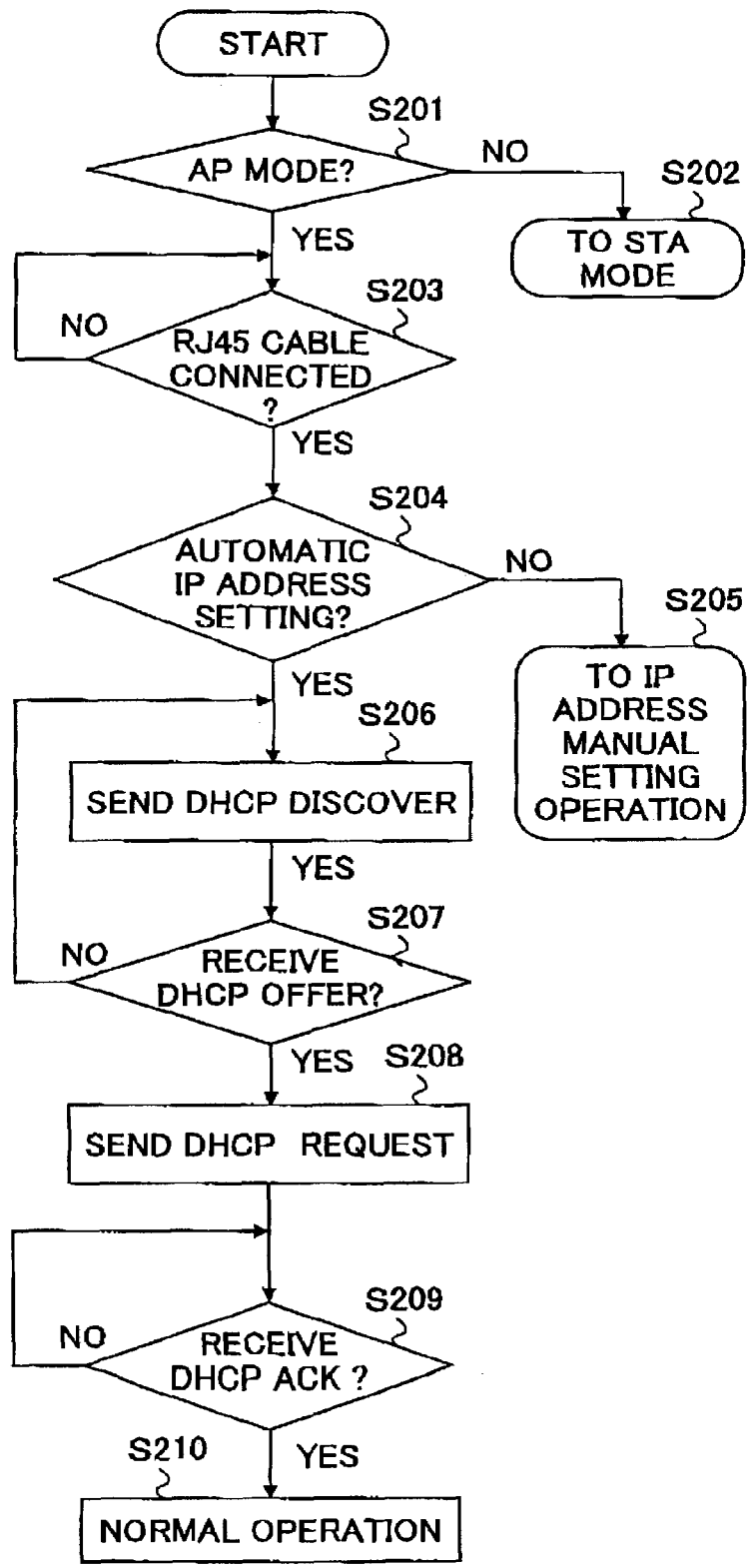
FIG. 6 is a flowchart illustrating a process in an AP mode.

A description will now be given, with reference to flowcharts in FIGS. 5 and 6, of the above process between the STA 10 and the AP 12. FIG. 5 shows a flowchart illustrating a process regarding the STA mode, which corresponds to the process of the STA 10 in this case. On the other hand, FIG. 6 shows a flowchart illustrating a process regarding the AP mode, which corresponds to the process of the AP 12 in this case.

A description will be given of a flowchart illustrating a process regarding the STA mode in FIG. 5. At step S101, it is determined whether or not a communication apparatus is in the STA mode. If the communication apparatus is not in the STA mode, the process proceeds to the AP mode at step S102. In this case, since the communication apparatus (the STA 10) is in the STA mode, the process proceeds to step S103. At step S103, it is determined whether or not the STA 10 is connected with an RJ 45 cable, and in other words, whether or not the STA 10 is connected with the physical layer. If not, this step is repeated until the STA 10 has a connection with the physical layer. If the connection is established, at step S104, it is determined whether or not an IP address acquisition setting of the STA 10 is set as an automatic setting. If not, the process proceeds to step S105 of a manual setting. If the IP address acquisition setting is automatic, the STA 10 sends a message "DHCP RELEASE" for the following reason; When the PC 14 has already an IP address, it is likely to lack consistency with the STA 10. Thus, the STA sends the message one more time in order to invalidate the IP address allocated to the PC 14. Then, at step S107, the STA 10 executes a normal operation. The normal operation means that the STA 10 is in a state wherein the STA 10 is currently waiting for data or a message. This state continues until the STA 10 receives the message "DHCP DISCOVER" from the PC 14 that has received the message "DHCP RELEASE". At step S109, when receiving the message "DHCP DISCOVER", the STA 10 sends a message "DHCP OFFER" to the PC 14 and then is waiting for a message "DHCP REQUEST" from the PC 14. At step S110, when receiving the message "DHCP REQUEST", the STA 10 sends a message "DHCP ACK" to the PC 14. Through the above process, the PC 14 acquires a temporary IP address. Then, the STA 10 proceeds to a process for connecting with the AP 12. At step S112, the STA 10 sends a message "Probe Request" to the AP 12 and is waiting for a message "Probe Response" from the AP 12. When receiving the message "Probe Response" at step S113, the STA 10 sends a message "Authentication" to authenticate and is waiting for the message "Authentication" from the AP 12. When receiving the message "Authentication" at step S115, the STA 10 sends a message "Association Request" to connect with the AP 12 and is waiting for a message "Association Response". At step S117, the STA 10 receives the message "Association Response" from the AP 12. Through the above process, the STA 10 has the connection with the AP 12. Now, the PC 14 is ready to communicate with the DHCP server 18 via the two communication apparatuses. In order to establish the connection with the DHCP server 18 properly, the STA to needs to let the PC 14 discard the temporary address that the STA 10 has already provided for the PC 14. Thus, the STA 10 sends a message "DHCP RELEASE" to the PC 14 at step S118 and executes the normal operation at step S119.

A description will now be given, with reference to a flowchart of FIG. 6, of a process regarding the AP mode. It should be noted that the process regarding the AP mode shown in FIG. 6 is related to the connection between the AP 12 and the DHCP server 18.

At step S201, it is determined whether or not a communication apparatus is in the AP mode. If the communication apparatus is not in the AP mode, the process proceeds to the STA mode at step S202. Since the communication apparatus (the AP 12) is in the AP mode in this case, the process proceeds to step S203. At step S203, it is determined whether or not the AP 12 is connected with an RJ 45 cable, and in other words, whether or not the AP 12 is connected with the physical layer. If not, this step is repeated until the AP 12 has a connection with the physical layer. If the connection is established, at step S204, it is determined whether or not an IP address acquisition setting of the AP 12 is set as an automatic setting. If not, the process proceeds to step S205 of a manual setting. If the IP address acquisition setting is automatic, the AP 12 sends a message "DHCP DISCOVER" to the DHCP server 18 and is waiting for a message "DHCP OFFER". When receiving the message "DHCP OFFER" at step S207, the AP 12 sends a message "DHCP REQUEST" to the DHCP server 18 at step S208 and is waiting for a message "DHCP ACK" from the DHCP server 18. When receiving the message "DHCP ACK" at step S209, the AP 12 proceeds to the normal operation at step S210. The process to allocate an IP address to the PC 14 by using the DHCP has been described under the case that it is impossible to connect with the communication apparatus 12 when the communication apparatus 10 receives an IP address request from the PC 14.

Figure 7:
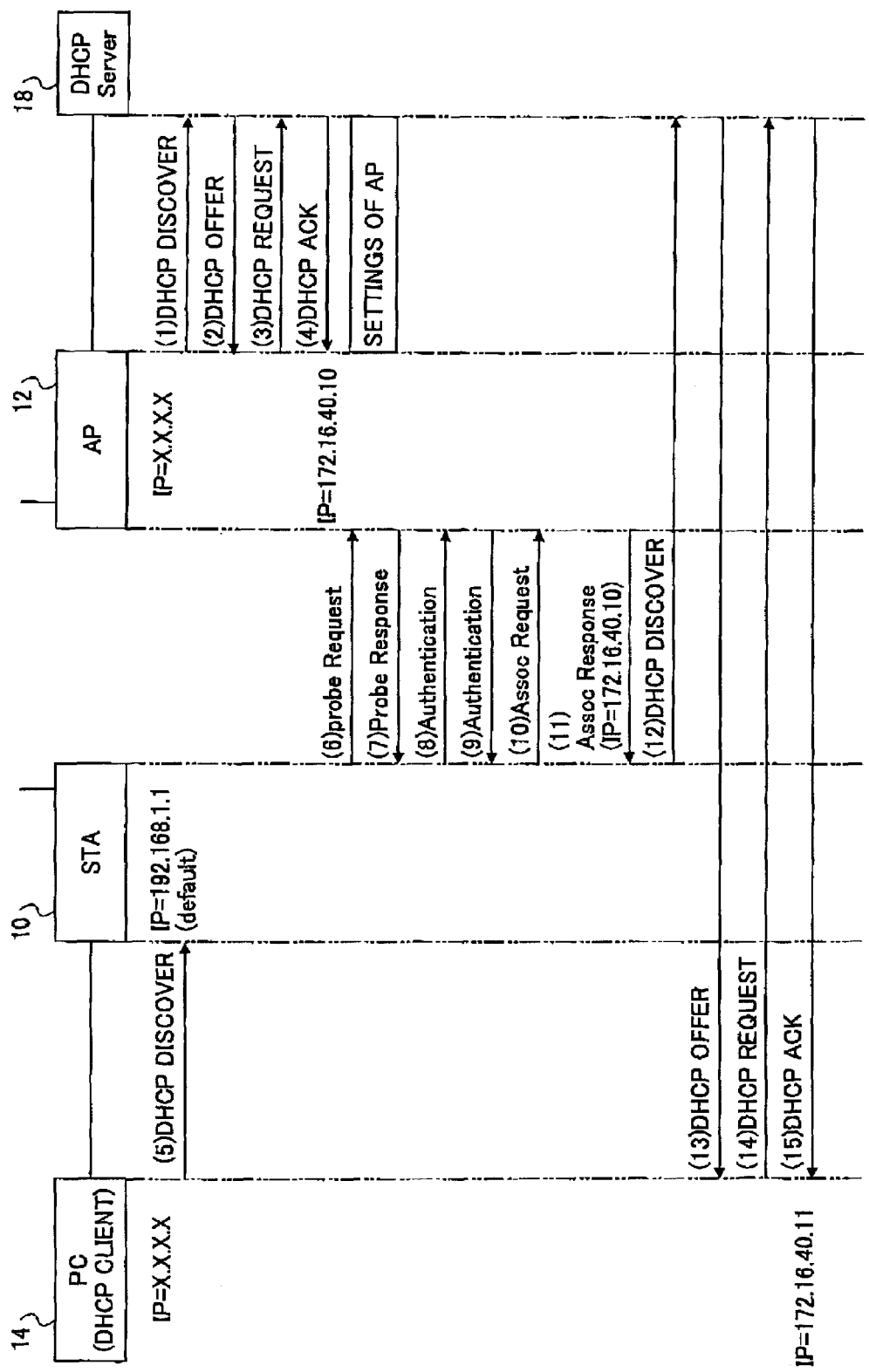
FIG. 7 is a sequence diagram illustrating how a DHCP server allocates an IP address in a case that it is possible that a first communication apparatus is connected with a second communication apparatus when the first communication apparatus receives an IP address request message from a terminal.

A description will now be given, with reference to FIG. 7, of the case that it is possible to connect with the communication apparatus 12 when the communication apparatus 10 receives an IP address request from the PC 14.

At the beginning, at step (1), the AP 12 sends a message "DHCP DISCOVER" (search) to search a DHCP server 18. At step (2), the DHCP server 18 sends a message "DHCP OFFER" (reply for search) back to the AP 12 to show that the DHCP server 18 works. At step (3), the AP 12 sends a message "DHCP REQUEST" (IP address request) to the DHCP server 18. At step (4), the DHCP server sends a message "DHCP ACK" (reply for IP address request) back to the AP 12, and an IP address (for example, 172.16.40.10) is allocated to the AP 12 by the DHCP server 18. On the other hand, when the DHCP server 18 cancels out an IP address that has been allocated to a DHCP client, the DHCP server 18 sends a message "DHCP RELEASE" to invalidate the IP address allocated. In the above manner, since the AP 12 has a connection with the network 16, the above-mentioned some settings regarding the AP 12 can be manipulated from another PC via the network 16.

A description will now be given of a correspondence between the PC 14 and the STA 10. Suppose that the PC 14 has a setting in which the PC 14 acquires an IP address by the DHCP. Further suppose that an IP address (for example, 192.16.8.1.1) is allocated to the SAT 10 as a default and that the SAT 10 continues the IP address until the SAT knows an IP address of the AP 12 by establishing a connection with the AP 12. Currently, the STA 10 and the AP 12 are assumed to have no connection each other.

In the above state, at step (5), the PC 14 sends a message "DHCP DISCOVER" to the STA 10. At this time, the STA 10 attempts to connect to the AP 12. At step (6), the STA 10 sends a message "Probe Request" to the AP 12. At step (7), the AP 12 sends a message "Probe Responses" back to the STA 10. The exchange of these messages serves to check whether or not it is possible to communicate between the STA 10 and the AP 12. At steps (8) and (9), the STA 10 and the AP 12 send a message "Authentication" each other to authenticate. After completing the authentication, at step (10), the STA 10 sends a message "Association Request" to the AP 12 so as to connect thereto. At step (11), the AP 12 sends a message "Association Response" together with an IP address (172.16.40.10) back to the STA 10. This IP address is the address that has been already allocated to the AP 12 by the DHCP server 18. The STA 10 uses this IP address as its own address instead of the default address. In such a manner, after establishing the connection between the STA 10 and the AP 12, the STA 10 sends a message "DHCP DISCOVER" that the STA 10 has already received from the PC 14, and the message "DHCP DISCOVER" is sent to the DHCP server 18 via the network 16. According to the above-mentioned procedure that the AP 12 acquires the IP address from the DHCP server 18, at step (13), the DHCP server 18 sends the message "DHCP OFFER" to the PC 14. At step (14), the PC 14 sends the message "DHCP REQUEST" (IP address request) to the DHCP server 18. At step (15), the DHCP server 18 sends the message "DHCP ACK" (reply for IP address request) back to the PC 14, whereby the PC 14 acquires an IP address.

Figure 8:
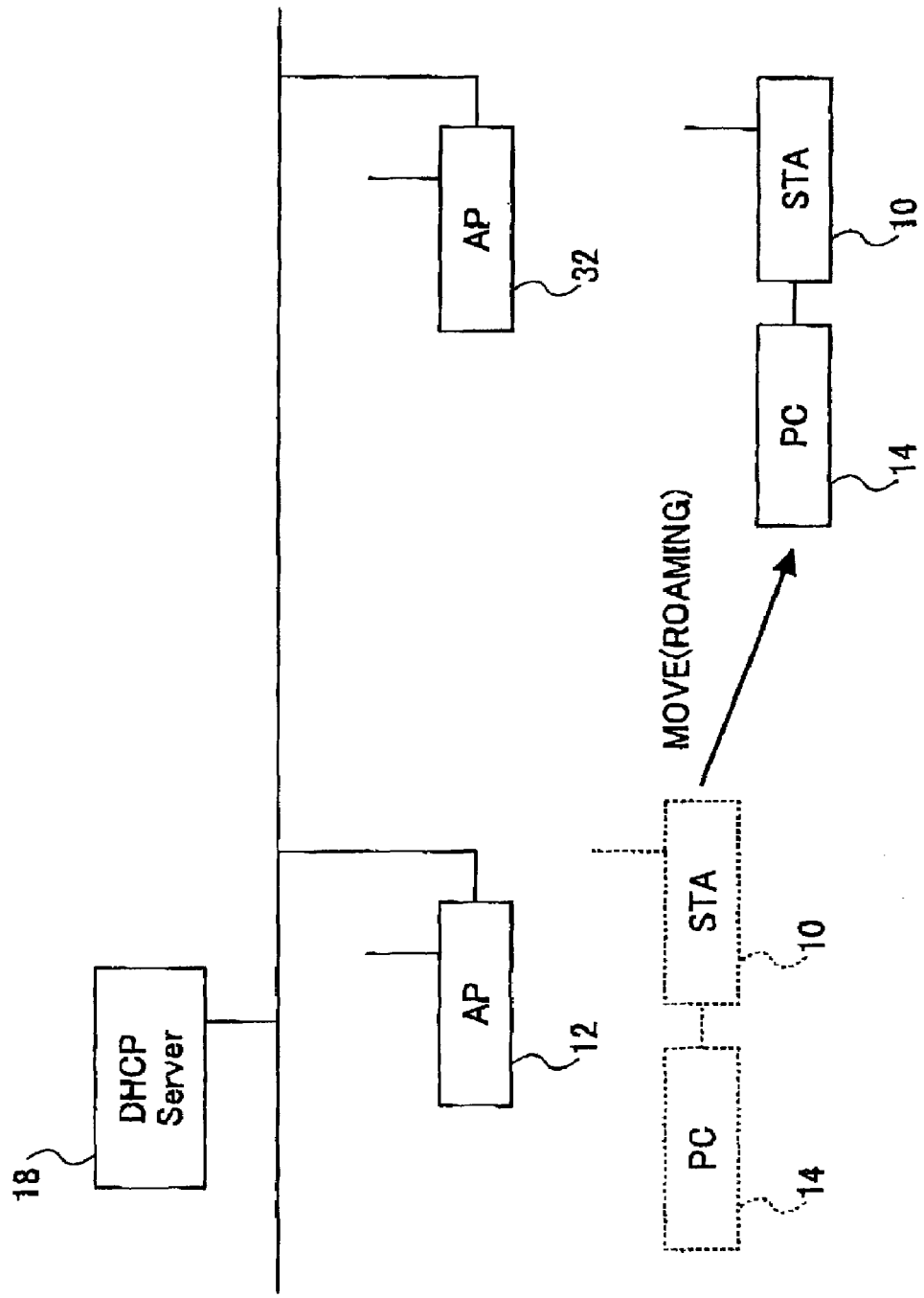
FIG. 8 is a diagram illustrating a configuration wherein a roaming is conducted.

A description will now be given, with reference to FIG. 8, of a roaming of the PC 14 possessing an IP address through the above process. The roaming in this description means that as shown in FIG. 8, the PC 14 and the STA 10 move and, in turn, connect with an AP 32 different from the AP 12 with which the PC 14 and the STA 10 have maintained a connection heretofore. In this case, the STA 10 needs to discard an IP address that the STA 10 has used and acquire a new IP address. In addition, if the AP 32 has a network address different from the AP 12, the PC 14 also needs to acquire a new address. In the following, a description will be given, with reference to a flowchart of FIG. 9, of a roaming method including a way in which these two addresses are allocated.

Figure 9:
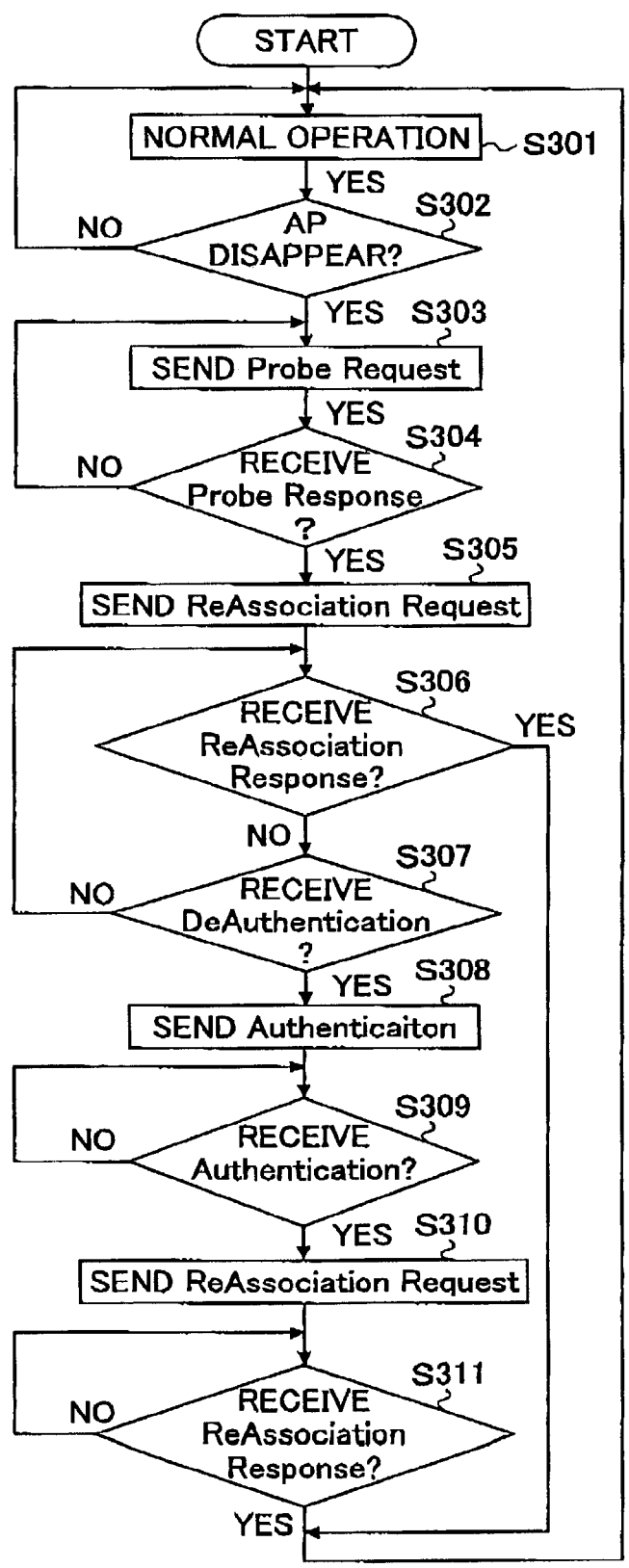
FIG. 9 is a flowchart illustrating a roaming process.

FIG. 9 shows the flowchart illustrating a roaming process. At step S301, the STA 10 performs a normal operation such as a transit operation. At step S302, it is determined whether or not the AP 12 disappears. If not, the process returns to step S301 and the STA 10 performs the normal operation. If the AP 12 disappears, the STA 10 sends a message "Probe Request" at step S303 and is looking for another AP. Regarding the disappearing determination, when the STA 10 cannot receive a beacon propagated by the AP 12, it is supposed that the AP 12 disappears. After sending the message "Probe Request", the STA 10 is waiting for receiving a message "Probe Response". At step S304, if the STA 10 cannot receive the message "Probe Response", the STA 10 sends the message "Probe Request" again. If the STA 10 can receive the message "Probe Response", the STA 10 sends a message "ReAssociation Request" (reconnect request) at step S305. At step S306, if the STA 10 receives a message "ReAssociation Response", the STA 10 returns to step S301. If not, it is determined whether or not the STA 10 receives a message "DeAuthentication". The message "DeAuthentication" means an authentication denial, which is sent in a case that the STA 10 and the AP 32, which is expected to be a substitute for the AP 12, do not authenticate each other. If the STA 10 does not receive the message "DeAuthentication", the STA returns to step S306. If the STA 10 receives the message "DeAuthentication", the STA 10 sends a message "Authentication" for requesting the authentication to the AP 32 at step S308 and is waiting for a message "Authentication" meaning an acceptance of the authentication. When receiving the message "Authentication" at step S309, the STA 10 sends a message "ReAssociation Requests" (reconnect request) to the AP 32 at step S310 and is waiting for a message "ReAssociation Response" (reconnect reply). Then, the STA 10 receives the message "ReAssociation Response" at step S311.

The message "ReAssociation Response" includes a new IP address that the AP 32 allocates to the STA 10. When the IP address is set to the STA 10, the roaming process for the STA 10 is completed. As mentioned above, if the AP 32 has a network address different from the AP 12, the PC 14 also needs to acquire a new address. Accordingly, the STA 10 sends the message "DHCP RELEASE" shown in FIG. 4 to the PC 14 in order to let the PC 14 discard an IP address that the PC 14 currently maintains. The PC 14 sends the message "DHCP DISCOVER" to the DHCP server 18 in order to acquire a new IF address. The message "DHCP DISCOVER" is sent to the DHCP server 18 via the STA 10 and the AP 32, because the STA 10 and the AP 32 have already established a connection each other through the above-mentioned process. The PC 14 acquires the IP address in accordance with the procedure of the DHCP shown in FIG. 4.

Figure 4:
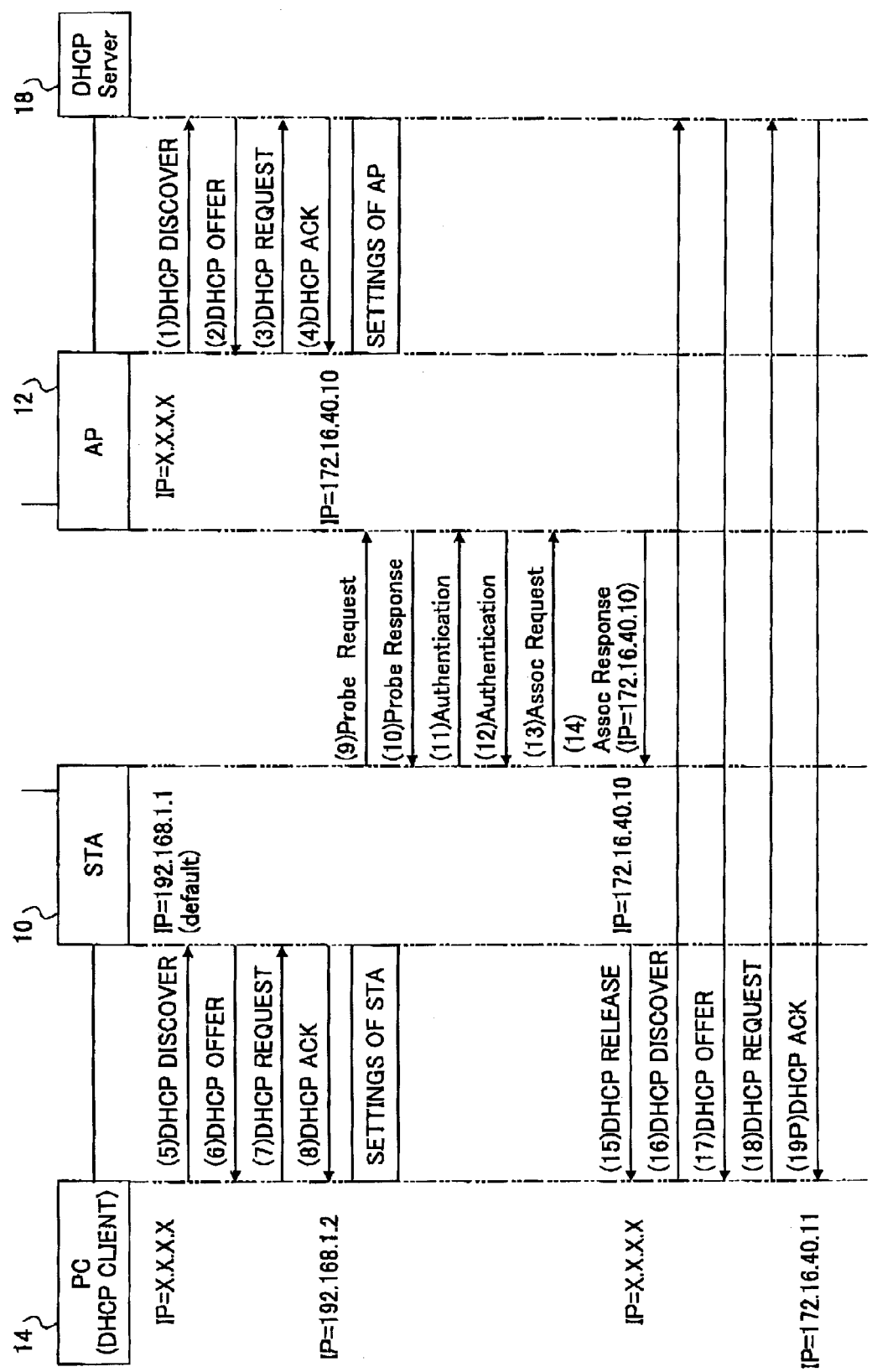
FIG. 4 is a sequence diagram illustrating how a DHCP server allocates an IP address in a case that it is impossible that a first communication apparatus is connected with a second communication apparatus when the first communication apparatus receives an IP address request message from a terminal.

Under the above-mentioned embodiment of the present invention, the operations (9) through (14) in FIG. 4, the operations S112 through S117 in FIG. 5, and the operations (6) through (11) in FIG. 6 correspond to a means to establish a communication path. Also, the operation (6) in FIG. 4 and the operation S109 in FIG. 5 correspond to a means to provide a temporary IP address. The operation (15) in FIG. 4 and the operation S118 in FIG. 5 correspond to a mean to discard the temporary IP address. The operations S303 through S311 correspond to a reconnect request at a roaming.

The present invention is not limited to the specifically disclosed embodiments, and variations and modifications may be made without departing from the scope of the present invention.

The present application is based on Japanese priority application No. 2001-351469 filed Nov. 16, 2001, the entire contents of which are hereby incorporated by reference.

What is claimed is:

1. A method for acquiring an IP address for a DHCP client from a DHCP server in a wireless communication system, the wireless communication system including a station (STA) physically connected with the DHCP client and an access point (AP) physically connected with the DHCP server, wherein in response to receipt of an IP address request from the AP via a network, the DHCP server assigns a first IP address to the AP;

in response to detection of a physical connection with the DHCP client, the STA assigns a possessed temporary IP address to the STA itself and the DHCP client, thereby establishing a communication between the DHCP client and the STA via the physical connection and enabling the DHCP client to set the STA;

in response to receipt of an IP address request from the DHCP client via a default IP address pre-assigned to the STA, the STA transmits temporary IP address to the DHCP client;

in response to detection of a physical connection with the DHCP server, the DHCP server assigns an IP address, thereby establishing a communication between the DHCP server and the AP via the physical connection and enabling the DHCP server to set the AP;

when the STA establishes a wireless connection with the AP, the STA acquires the first IP address and transmits an IP address release to the DHCP client to cause the DHCP client to invalidate the temporary IP address;

in response to receipt of the IP address release from the STA, the DHCP client invalidates the temporary IP address and transmits an IP address request to the DHCP server via the STA and the AP wirelessly connected with each other to acquire a second IP address dedicated to the DHCP client, wherein the setting the STA comprises the DHCP client transmitting a DHCP DISCOVER to the STA, the STA transmitting a DHCP OFFER to the DHCP client, the DHCP client transmitting a DHCP REQUEST for an IP address to the STA, the STA transmitting a DHCP ACK and the temporary IP address to the DHCP client, and the DHCP client acquiring the temporary IP address by receiving the DHCP ACK, thereby establishing a physical communication between the DHCP client and the STA, and the method further comprises, upon establishing the physical communication between the DHCP client and the STA, initialing the wireless communication between the STA and the AP.

* * * * *